United States Patent [19]

Kaiser

[11] Patent Number: 4,605,318
[45] Date of Patent: Aug. 12, 1986

[54] ELASTIC SEAL FOR USE IN ANTIFRICTION BEARINGS

[75] Inventor: Theodor Kaiser, Höchstadt, Fed. Rep. of Germany

[73] Assignee: INA Walzlager Schaeffler KG, Fed. Rep. of Germany

[21] Appl. No.: 774,911

[22] Filed: Sep. 11, 1985

[30] Foreign Application Priority Data

Sep. 27, 1984 [DE] Fed. Rep. of Germany ....... 3435437

[51] Int. Cl.⁴ .............................................. F16C 33/78
[52] U.S. Cl. .................................... 384/482; 384/485; 277/95
[58] Field of Search ............... 384/485, 482, 147, 140; 277/27, 95, 212 C, 165

[56] References Cited

U.S. PATENT DOCUMENTS

| | | | |
|---|---|---|---|
| 3,449,029 | 6/1969 | Smith | 384/482 |
| 3,797,899 | 3/1974 | Anderson | 384/485 |
| 3,856,368 | 12/1974 | Andersen | 384/485 |
| 4,497,495 | 2/1985 | Christiansen | 277/27 |

Primary Examiner—Lenard A. Footland
Attorney, Agent, or Firm—Bierman, Peroff & Muserlian

[57] ABSTRACT

An elastic annular seal for use in an antifriction bearing wherein a portion of the inner race extends axially beyond the adjacent end face of the outer race and the races define an annular gap extending axially toward the chamber for the rolling elements of the bearing. The seal has a disc-shaped supporting portion which is anchored in a groove of the portion of the inner race, a sleeve which extends from the supporting portion axially toward and into the gap and bears against the inner race, a first lip which extends from the supporting portion and one axial end of the sleeve externally of the gap and sealingly and slidingly engages the end face of the outer race, and a second lip which is integral with the other axial end of the sleeve and slopes in the gap radially outwardly toward and into sealing and sliding engagement with the outer race. The lubricating material which accumulates in the annular space between the two lips enhances the sealing action by preventing moisture, dust and/or other foreign matter from penetrating axially into contact with the rolling elements. Such lubricating material issues from the space for the rolling elements and deforms the radially outermost portion of the second lip on its way into the space between the lips.

5 Claims, 2 Drawing Figures

ELASTIC SEAL FOR USE IN ANTIFRICTION BEARINGS

BACKGROUND OF THE INVENTION

The present invention relates to elastic seals for use in ball, roller and other antifriction bearings, and to antifriction bearings which utilize such seals.

It is already known to construct an antifriction ball or roller bearing in such a way that a portion of one of the races extends axially beyond the other race and the axially extending portion of the one race carries an elastic seal with a lip which is in sealing and sliding contact with the adjacent end face of the other race. The purpose of the lip and of that portion of the seal which is secured to (e.g., embedded in) the portion of the one race is to reduce the likelihood of penetration of foreign matter into the gap which is provided between the two races and extends axially toward the space for the rolling elements of the antifriction bearing. In many instances, the portion of the one race is formed with a circumferentially complete groove for a relatively thick and stable washer-like supporting portion of the seal.

A seal of the above outlined character ensures adequate prevention of penetration of foreign matter into the gap between the two races, not only because the seal is anchored in one of the races and its lip bears against the adjacent end face of the other race but also because the lip allows for the accumulation of a ring of lubricating material therealong whereby the thus accumulated lubricating material further reduces the likelihood of penetration of foreign matter into the space for the rolling elements. The just described seals are particularly effective when the axis of the assembled antifriction bearing is vertical and the bearing is adequately lubricated; the lip and the developing ring of lubricating material then satisfactorily shield the rolling elements from dust, moisture and/or other foreign matter which could adversely affect the useful life of the bearing. However, it has been ascertained that the shielding action of the aforedescribed conventional seals is much less satisfactory when the axis of the bearing is horizontal or substantially horizontal and the bearing is not lubricated at sufficiently frequent intervals. In fact, a bearing which is adequately lubricated is still likely to permit penetration of moisture and/or other undesirable foreign matter (irrespective of the inclination of its axis) if it is cleaned with one or more jets of water at an elevated pressure or with one or more jets of steam. Moisture which penetrates into the space for the rolling elements of the bearing is likely to cause considerable damage or, at the very least, reduce the useful life of the bearing.

Attempts to overcome the drawbacks of the above described conventional bearings and their seals include the provision of several additional seals in the form of rings having a substantially V-shaped cross-sectional outline and being inserted into the gap between the two races so that their legs extend into grooves machined therefor in those surfaces of the races which bound the groove. The machining of grooves into those surfaces of the races which flank the gap contributes to the cost of such bearings. Moreover, the grooves for the V-shaped sealing rings in the inner and outer races of the bearing cannot be placed into immediate proximity of each other so that the utilization of such additional sealing rings necessitates an increase of the bulk and weight of the bearing, especially an increase in the axial dimensions of the races. Therefore, bearings with several V-shaped sealing rings are used only for special purposes and have failed to gain widespread acceptance in the industry. The initial cost of such bearings is much higher than that of bearings with single seals, and the cost of replacing V-shaped sealing rings is high because the rings cannot be reached without at least partial dismantling of the bearings.

OBJECTS AND SUMMARY OF THE INVENTION

An object of the invention is to provide a novel and improved annular elastic seal which can be used in ball bearings and other types of antifriction bearings as a superior substitute for heretofore known seals.

Another object of the invention is to provide a seal which can more effectively prevent the penetration of moisture, dust and/or other contaminants into the space for the rolling elements of an antifriction bearing than the heretofore known seals.

A further object of the invention is to provide a seal which can more effectively direct the flow of and distribute lubricating material in an antifriction bearing than heretofore known seals.

An additional object of the invention is to provide a seal which can accomplish the above outlined objects without necessitating any increase in the bulk of the bearing.

Still another object of the invention is to provide a seal which exhibits the above outlined advantages and can be utilized with the races of conventional antifriction ball, roller or like bearings.

A further object of the invention is to provide a ball, roller or other antifriction bearing which embodies the above outlined seal and can be utilized as a superior substitute for heretofore known antifriction bearings.

An additional object of the invention is to provide a ball, roller or other antifriction bearing wherein the seal promotes the flow of lubricating material to selected portions of the gap between the races.

Another object of the invention is to provide a method of increasing the effectiveness of seals in antifriction bearings.

A further object of the invention is to provide a bearing wherein a worn or damaged seal can be rapidly replaced with a fresh seal without even partial dismantling of the bearing.

One feature of the invention resides in the provision of an elastic annular seal for use in an antifriction bearing of the type having two coaxial races which define an axially extending annular gap. The seal comprises a supporting portion which can be mounted in or on one of the races (preferably in a portion of the inner race at a location outside of and adjacent to the gap), a first sealing lip which is integral with the supporting portion and serves to extend into sealing and sliding engagement with the other race externally of the gap, a sleeve which is integral with the supporting portion and serves to extend into the gap, and at least one additional sealing lip which is integral with the sleeve and serves to sealingly and slidably engage the other race in the interior of the gap.

The additional lip comprises a first annular end portion which is integral with the sleeve and is remote from the gap, and a second annular end portion which is nearer to the gap when the supporting portion is mounted in or on the one race. The sleeve is preferably arranged to undergo deformation in response to its introduction into the gap so that one of its sides is maintained in large surface-to-surface contact with the one race.

That annular end portion of the sleeve which is remote from the supporting portion of the seal is preferably formed with a pronounced ring-shaped edge which bears against the one race when the sleeve extends into the gap.

Another feature of the invention resides in the provision of an antifriction bearing which comprises two coaxial races each of which can constitue a ring and which define an annular gap. A portion of one of the races extends axially beyond the other race. The other race has an end face at the other side of the gap. The bearing further comprises an elastic annular seal including a supporting portion which is affixed to the aforementioned portion of the one race, a sleeve which is integral with the supporting portion, which extends into the interior of the gap and into contact with the one race, a first lip which is integral with the supporting portion, which is located outside of the gap and which sealingly and slidably engages the end face of the other race, and at least one additional lip which is integral with the sleeve, which is located in the gap and which sealingly and slidably engages the other race. The additional lip preferably slopes in the gap axially and radially from the sleeve toward the exterior of the gap and toward and into sealing engagement with the other race.

The aforementioned surface of the one race can be provided with a circumferential groove which receives the supporting portion of the seal. The sleeve has a side or surface which preferably abuts, in its entirety, flush against the one race in the gap. The seal is preferably installed in prestressed condition so that the sleeve is caused to bear flush against the one race in the gap. That end portion of the sleeve which is located in the gap is preferably provided with a pronounced ring-shaped edge which bears against the one race in the gap.

The novel features which are considered as characteristic of the invention are set forth in particular in the appended claims. The improved seal itself, however, both as to its construction and the mode of using the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
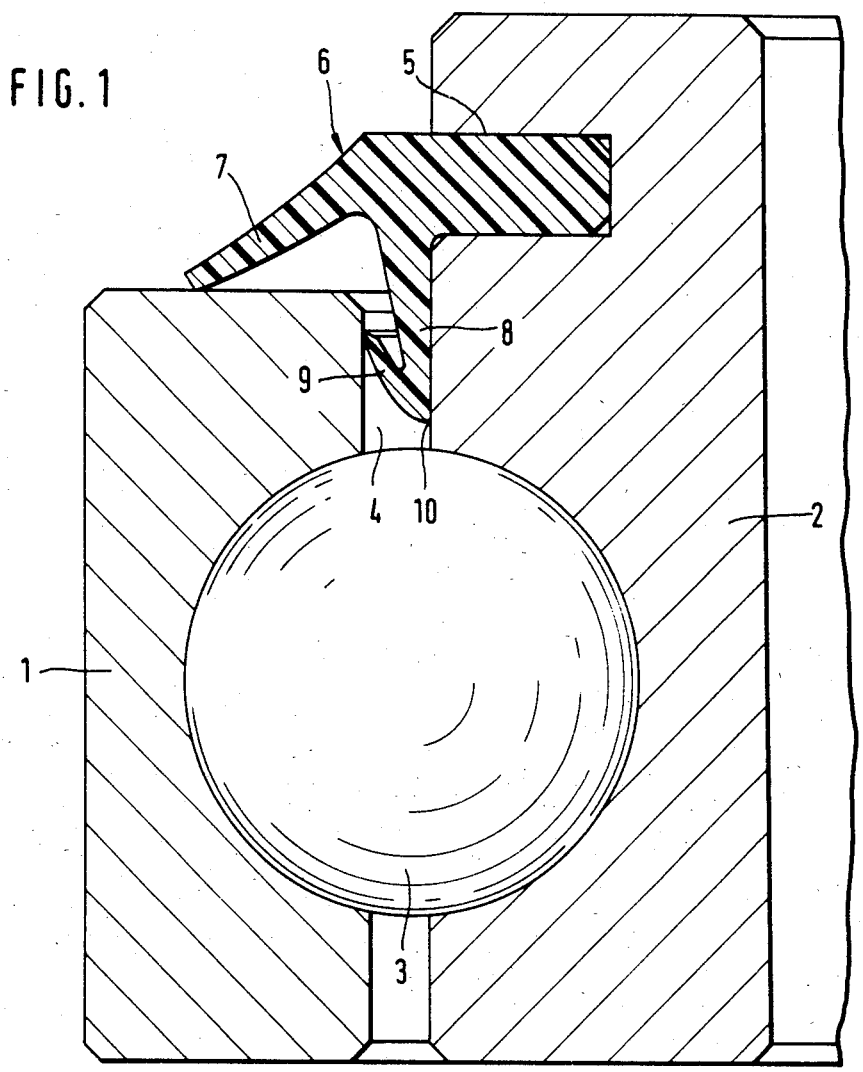
FIG. 1 is a fragmentary axial sectional view of an antifriction ball bearing which embodies the improved seal.

FIG. 1 shows a portion of an antifriction ball bearing with an outer race 1, an inner race 2 and an annulus of spherical rolling elements 3 of which only one is actually shown in the drawing. The races 1 and 2 define an annular gap 4. The inner race 2 has an axially extending portion which is located outside of the gap 4 and has a circumferentially complete groove 5.

The ball bearing further comprises an annular elastic seal 6 including a main or supporting portion 11 which is a washer and is sealingly received in the groove 5, an axially extending cylindrical collar or sleeve 8 which is integral with the supporting portion 5 and whose inner end portion has a pronounced (sharp) circular edge 10 bearing against the race 2, a circumferentially complete lip 9 whose radially innermost portion is integral with the end portion of the sleeve 8 in the region of the edge 10 and whose free (unattached) radially outermost portion is in sealing and sliding engagement with the race 1 in the gap 4, and a second lip 7 which is integral with the supporting portion 5 and/or with the adjacent other end portion of the sleeve 8 and slopes axially and radially outwardly of the gap 4 and toward sealing and sliding engagement with the outer race 1.

The lip 7 constitutes an outer barrier and the lip 9 constitutes an inner barrier against penetration of foreign matter into the chamber or space for the rolling elements 3. The purpose of the pronounced edge 10 is to prevent the penetration of grease and/or other lubricating material between the right-hand side or surface of the sleeve 8 and the adjacent portion of the inner race 2. Any lubricating material which tends to advance axially in a direction from the space for the rolling elements 3 can deform the flexible lip 9 in a direction toward the left-hand side of the sleeve 8 so that such material can penetrate into and is retained in the annular space between the lips 9 and 7. Penetration of lubricating material into the space between the lips 7 and 9 is possible because the inner lip 9 slopes radially and axially in a direction from the inner race 2 toward the outer race 1.

Figure 2:
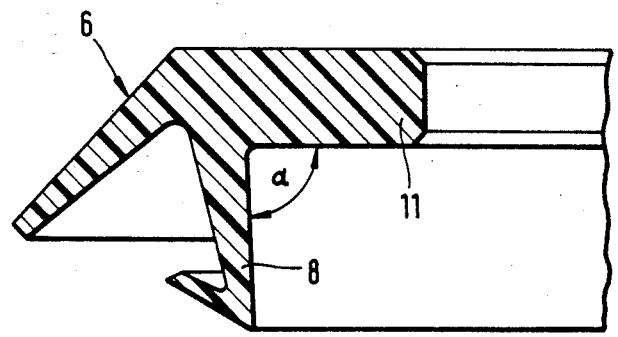
FIG. 2 is a fragmentary axial sectional view of the seal in detached condition.

FIG. 2 shows the seal 6 in detached position. It will be noted that the angle alpha between the underside of the supporting portion 11 and the right-hand side or surface of the sleeve 8 is a relatively large acute angle. The angle between the inner portion of the race 2 and the lower surface in the groove 5 of the inner race 2 is larger than the angle alpha (e.g., the angle between the sleeve 8 and portion 11 can equal or at least slightly exceed 90 degrees); therefore, when the supporting portion 11 is fully inserted into the groove 5, the entire right-hand surface of the sleeve 8 lies flush against the adjacent portion of and bears against the inner race 2 to further reduce the likelihood of penetration of lubricating material beyond the pronounced edge 10 and thereupon between the sleeve 8 and inner race 2.

An important advantage of the improved seal 6 and of the antifriction bearing which embodies the seal is that the space for the antifriction rolling elements 3 is reliably sealed against penetration of foreign matter from the outside as well as that the sealing action of the part 6 is automatically enhanced by lubricating material which penetrates between the lips 7 and 9 by advancing axially beyond the radially outermost portion of the lip 9 and into the gap 4 nearest to the rim of the inner race 2. If the depth of the gap 4 outwardly of the annulus of rolling elements 3 is sufficient, the sleeve 8 can carry several lips 9 to even further reduce the likelihood of penetration of foreign matter (including moisture) from the outermost portion of the gap 4 toward the space for the rolling elements of the bearing.

Another important advantage of the improved seal and of the bearing is that the sleeve 8 and the lip or lips 9 extend into that portion of the gap 4 which is available anyway so that the provision of the improved seal does not contribute to the bulk of the bearing i.e., to increased dimensions of the races 1 and 2, as considered in the radial and/or axial direction of the bearing. Moreover, the improved seal can be installed in many existing antifriction bearings wherein the supporting portion 11 of the seal can be anchored in that part of one of the races which extends axially outwardly beyond one end face of the other race.

Lubricating material is likely to penetrate into the space between the sealing lips 7 and 9 during initial lubrication as well as during renewed lubrication of the bearing. This ensures that the space between the lips 7 and 9 accumulates and retains a ring-shaped mass of lubricating material which complements the sealing action of the lips 7 and 9 and further reduces the likelihood of penetration of moisture and/or other foreign matter into the space for the rolling elements 3. The illustrated lip 9 not only allows for the propagation of lubricating material from the space for the rolling elements 3 into the space between the lips 7 and 9 but it also effectively opposes penetration of flowable substances in the opposite direction, i.e., from the outermost portion of the gap 4 toward and into the space for the rolling elements 3. This will be readily appreciated since any material which gathers in the space between the lips 7 and 9 and tends to penetrate toward the rolling elements 3 will urge the free radially outermost portion of the lip 9 into more pronounced sealing engagement with the outer race 1 to thereby enhance the resistance of the lip 9 to the flow of any material in a direction from the lip 7 toward the rolling elements 3.

A further important advantage of the improved seal and of the improved bearing is that one side or surface of the sleeve 8 bears against the adjacent portion of the inner race 2 and also that the end portion of the sleeve 8 in the gap 4 is formed with the aforediscussed pronounced edge 10. This effectively prevents, or highly reduces the likelihood of, penetration of lubricating material between the sleeve 8 and the adjacent portion of the race 2. Lubricant between the sleeve 8 and supporting portion 11 could force the supporting portion 6 out of its groove 5. The edge 10 further serves as a means for steering the axially flowing lubricating material away from the sleeve 8 and toward and along the adjacent side of the lip 9, i.e., toward the outer race 1, so that such lubricating material can penetrate into the space between the lips 7 and 9. This further reduces the likelihood of loosening of the supporting portion 11 in the groove 5 of the inner race 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An antifriction bearing comprising two coaxial races, said races defining an annular gap and one of said races having a portion extending axially beyond the other of said races, said other race having an end face at the other side of said gap; and an elastic annular seal including a supporting portion affixed to said portion of said one race, a sleeve integral with said supporting portion, extending into the interior of said gap and contacting said one race, a first lip which is integral with said supporting portion, which is located outside of said gap, and which sealingly and slidably engages the end face of said other race, and at least one additional lip integral with said sleeve, located in said gap and sealingly and slidably engaging said other race.

2. The bearing of claim 1, wherein said additional lip slopes in said gap axially and radially from said sleeve toward the exterior of said gap and toward and into sealing and sliding engagement with said other race.

3. The bearing of claim 1, wherein said portion of said one race has a circumferential groove and the supporting portion of said seal is received in said groove, said sleeve having a surface abutting in its entirety flush against said one race in said gap.

4. The bearing of claim 1, wherein said seal is installed in said one race in prestressed condition such that said sleeve bears flush against said one race in said gap.

5. The bearing of claim 1, wherein said sleeve includes an end portion which is remote from said supporting portion and is provided with a pronounced ring-shaped edge which bears against said one race in said gap.

* * * * *